United States Patent [19]
Miller, Jr. et al.

[11] Patent Number: 5,445,900
[45] Date of Patent: Aug. 29, 1995

[54] ELECTRONIC DEVICE HAVING A REMOVABLE BATTERY PACK ASSEMBLY

[75] Inventors: Kenneth Miller, Jr., Devault; William J. Duffy, Jr., Downington, both of Pa.

[73] Assignee: Invisible Fence Company, Inc., Malvern, Pa.

[21] Appl. No.: 107,868

[22] Filed: Aug. 18, 1993

[51] Int. Cl.⁶ .............................................. H01M 2/10
[52] U.S. Cl. .......................................... 429/1; 429/97; 429/100; 429/123
[58] Field of Search .................... 429/96, 97, 98, 100, 429/123, 1, 9

[56] References Cited

U.S. PATENT DOCUMENTS

| | | | |
|---|---|---|---|
| 1,676,945 | 7/1928 | Ellis | 429/96 |
| 2,023,950 | 12/1935 | Carter . | |
| 2,703,344 | 3/1955 | Anderson . | |
| 2,741,224 | 4/1956 | Putnam . | |
| 2,800,104 | 7/1957 | Cameron et al. . | |
| 2,996,043 | 8/1961 | Pettingill . | |
| 3,589,337 | 6/1971 | Doss | 119/29 |
| 3,608,524 | 9/1971 | Waltz | 119/29 |
| 3,777,712 | 12/1973 | Gardner et al. | 119/29 |
| 3,827,403 | 8/1974 | Meyer | 119/29 |
| 3,897,753 | 8/1975 | Lee et al. | 119/51 R |
| 3,980,051 | 9/1976 | Fury | 119/29 |
| 3,983,483 | 9/1976 | Pando | 325/16 |
| 4,202,293 | 5/1980 | Gonda et al. | 119/29 |
| 4,335,682 | 6/1982 | Gonda et al. | 119/29 |
| 4,539,937 | 9/1985 | Workman | 119/29 |
| 4,622,274 | 11/1986 | Lowrance | 429/1 |
| 4,644,244 | 2/1987 | Kittleson | 429/100 X |
| 4,745,882 | 5/1988 | Yarnall, Sr. et al. | 119/29 |
| 4,765,276 | 8/1988 | Kime | 119/29 |
| 4,766,847 | 8/1988 | Venczel et al. | 119/29 |
| 4,842,966 | 6/1989 | Omori et al. | 429/96 |
| 4,898,120 | 2/1990 | Brose | 119/29 |
| 4,967,695 | 11/1990 | Giunta | 119/29 |
| 4,969,418 | 11/1990 | Jones | 119/29 |
| 5,067,441 | 11/1991 | Weinstein | 119/29 |
| 5,149,598 | 9/1992 | Sunshine | 429/123 X |
| 5,170,149 | 12/1992 | Yarnall, Sr. et al. | 340/573 |

*Primary Examiner*—Stephen Kalafut
*Attorney, Agent, or Firm*—Dann, Dorfman, Herrell and Skillman

[57] ABSTRACT

A battery pack assembly is removably insertable into a receptacle on a housing of an electronic receiver carried by an animal to control the movement of the animal relative to a predetermined area. The battery pack assembly supplies power to the electronic receiver. The receptacle for the battery pack has internal guide grooves and detents along the guide grooves. The battery pack has lugs which slide within the guide grooves to guide the battery pack into position within the receptacle. The detents cooperate with the movement of the lugs to lock the battery pack in position within the receptacle housing. A spring contained within the battery pack biases the battery pack relative to the receptacle to prevent the battery pack from inadvertently disengaging from the housing.

26 Claims, 3 Drawing Sheets

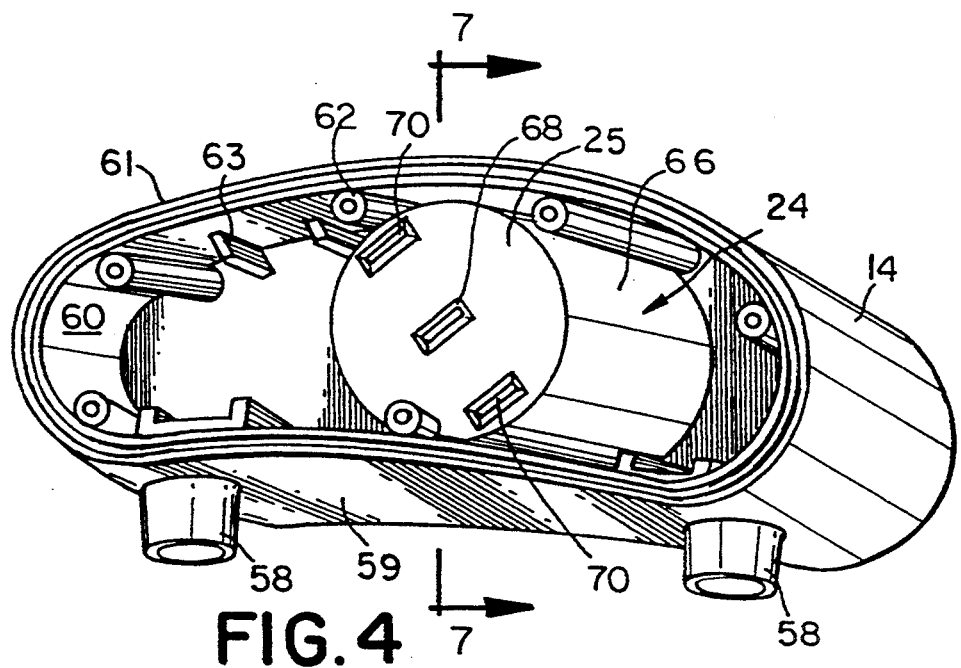
FIG. 4
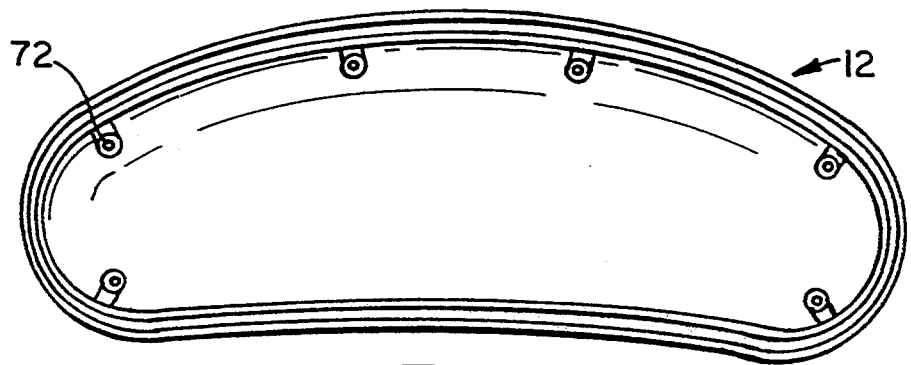
FIG. 5
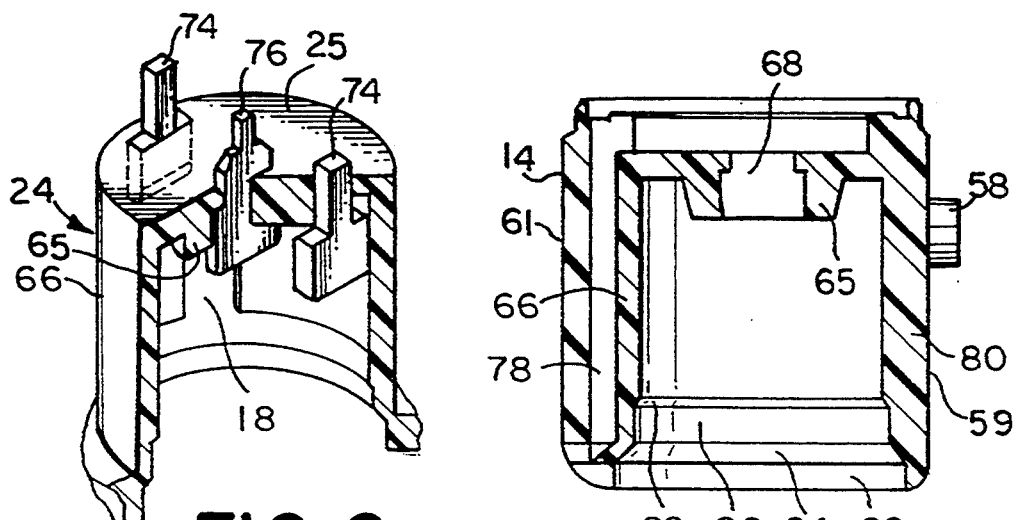
FIG. 6
FIG. 7

ELECTRONIC DEVICE HAVING A REMOVABLE BATTERY PACK ASSEMBLY

FIELD OF THE INVENTION

The present invention generally relates to an electronic device having a removable battery pack assembly and, more specifically, to a battery pack for supplying power to an electronic receiver having a receptacle for the battery pack.

BACKGROUND OF THE INVENTION

Electronic pet containment systems have been in common use to control the movement of animals relative to a predefined area. In general, these pet containment systems monitor the position of the animal relative to the predefined area and function to provide a stimulus to the animal in order to control the movement of the animal. For example, if it is determined that the animal has moved outside a designated area, an electronic receiver carried by the animal detects a transmitted signal and applies a stimulus, such as a harmless shock or desired noise, to the animal, indicating to the animal that it has moved outside the allowed area. Within a short period of time, the animal responds to the applied stimulus and becomes trained to remain within the allowed area.

The electronic receivers carried by the animals are typically powered by batteries. The batteries contained in the electronic receivers have a limited life and, accordingly, must be replaced on a regular basis. Typically, the receiver must be partially disassembled in order to remove and discard the old batteries. During battery replacement, care must be taken, however, to ensure that the proper batteries are installed since incompatible batteries might destroy or adversely affect the electronics in the receiver. In addition, the battery or batteries must be installed in the correct orientation to ensure proper polarity.

In accordance with the present invention, a battery pack assembly is provided for insertion into a receptacle of an electronic receiver. The use of the battery pack, in accordance with the present invention, solves the problems associated with battery replacement in electronic receivers of the type used in electronic pet containment systems.

SUMMARY OF THE INVENTION

In accordance with the present invention, a battery pack assembly is provided for supplying power to an electronic receiver. The electronic receiver includes a housing having a receptacle for receiving a plug-in battery pack.

The battery pack includes a generally hollow holder for receiving and containing a battery having first and second terminals. The battery holder is generally cylindrical in shape having an opening at one end and a generally closed base at the other end. At least one internal longitudinal groove is provided on the inside of the battery holder extending generally from the base of the battery holder to the opening of the battery holder.

The battery pack also includes a contactor having a spring located within the battery holder and at least one contact extending externally of the battery holder. The spring may be in the form of an elongated flexion spring located inside the battery holder between the base of the battery holder and the battery for biasing the battery toward the opening of the battery holder. The flexion spring may be positioned within the battery holder so that the respective ends of the spring are in contact with the base of the battery holder and a resiliently bowed center portion is positioned for electrically contacting the first terminal of the battery when the battery is inserted into the battery holder. The electrical contact may be connected with one end of the spring for electrical connection with the first terminal of the battery. The contact is recessed within the longitudinal groove of the battery holder to provide clearance for the battery. The contact extends outside the opening of the battery holder for electrical connection with the electronic receiver.

At least one lug connector is positioned externally on the battery holder to enable the battery pack to be removably mounted within the receptacle of the electronic device. The lug connector may be positioned on the outside of the battery holder proximate the end opening of the battery holder. A retaining ring is mounted at the opening of the battery holder for retaining the battery inside the battery holder against the bias of the spring. The retaining ring includes a central aperture through which the second terminal of the battery is exposed at the opening of the battery holder for electrical connection with the electronic receiver. At least one contact passageway is provided along the outer periphery of the retaining ring to permit the contact of the contactor to pass therethrough.

The receptacle on the housing of the electronic receiver includes a generally open end at the exterior of the housing and a generally closed end recessed into the interior of the housing to permit the insertion of the battery pack therein. The receptacle includes at least one internal guide groove originating at the open end of the receptacle for receiving the lug connector of the battery pack for confined movement within the guide groove. The lug connector slides within the guide groove during insertion or removal of the battery pack relative to the receptacle. The guide groove functions to guide and locate the battery pack within the receptacle of the receiver housing. The receptacle includes a detent along the guide groove for cooperating with the connector lug of the battery pack to retain the battery pack in position within the receptacle. A receptacle contact is positioned at the generally closed end of the receptacle for electrical connection with the second terminal of the battery. The receptacle contact is positioned to engage the second terminal of the battery during insertion of the battery pack into the receptacle, thereby causing the spring of the contactor to yield so that the lug connector may be positioned within the guide groove so that the spring biases the battery pack to retain the battery pack in position within the receptacle.

The guide groove in the receptacle may be generally L-shaped having a longitudinal section originating at the open end of the receptacle to guide the lug connector for longitudinal displacement of the battery pack within the receptacle to permit, for example, insertion of the battery pack into the receptacle. The guide groove includes an adjoining transverse section to permit transverse or lateral movement of the lug connectors so that the battery pack may be moved or turned within the receptacle to hold the battery pack in position under bias of the spring of the contactor. The detent may be positioned along the transverse section of the L-shaped guide groove to retain the battery pack in position within the receptacle.

During insertion of the battery pack, the second terminal of the battery engages the receptacle contact at the bottom of the receptacle, thereby causing the spring of the contactor to yield in order to permit the lug connector to be moved laterally within the transverse section of the guide groove past the detent. The spring then functions to bias the battery pack so that the detent is in position to engage the lug connector to hold the battery pack within the receptacle.

A sealing ring may be positioned around the outside of the battery holder at the closed end of the battery holder to form a seal between the housing and the battery pack. The sealing ring is carried on the battery holder so that insertion of the battery pack into the receptacle causes the sealing ring to engage the receptacle about the open end of the receptacle to form a water-tight seal.

BRIEF DESCRIPTION OF THE DRAWINGS

The foregoing summary as well as the following detailed description of the preferred embodiments of the present invention will be better understood when read in conjunction with the appended drawings, in which:

FIG. 4 is a perspective view of the receiver housing with its lid removed to show the interior of the housing;

FIG. 5 is a plan view of the underside of the lid which covers the receiver housing;

FIG. 6 is an enlarged fragmentary sectional perspective view of the receptacle of the receiver housing with cathode and anode contacts inserted;

FIG. 7 is an enlarged cross-sectional view of the receptacle and the receiver housing;

DETAILED DESCRIPTION OF THE PREFERRED EMBODIMENTS

In an electronic animal confinement system, an electronic battery-powered receiver is carried by an animal to control the movement of the animal relative to a predetermined area. As the animal approaches the limits of the predetermined area, the electronic receiver on the animal detects a transmitted signal whereupon the receiver administers a selected stimulus, such as an electrical shock, to the animal.

Figure 1:
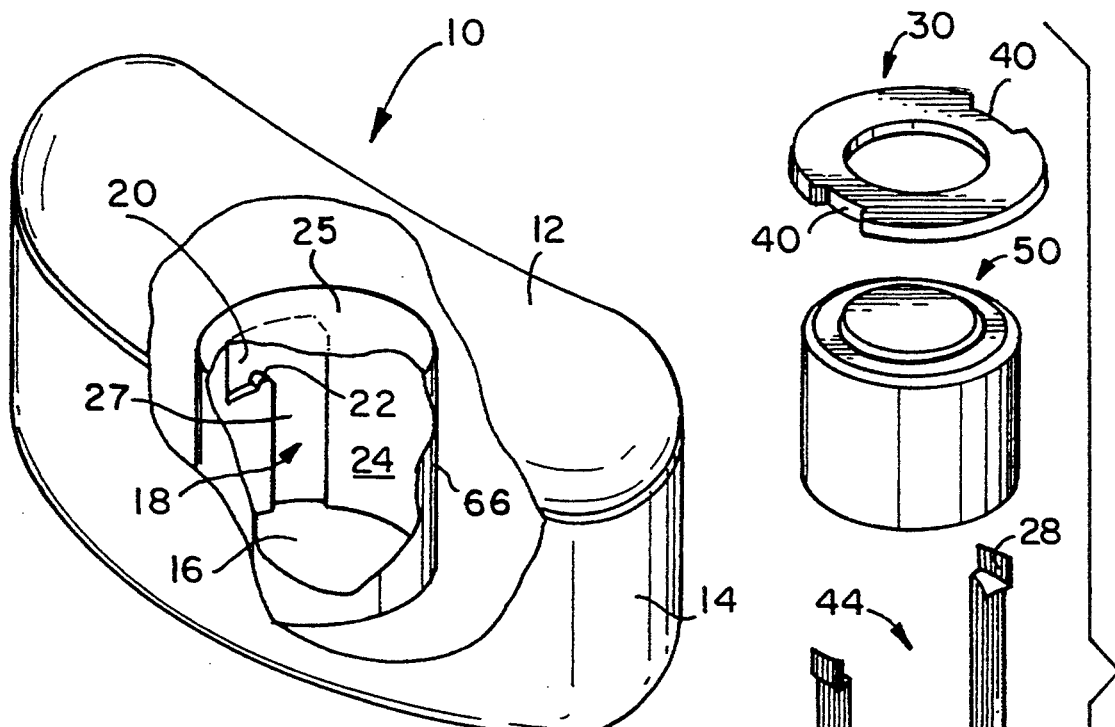
FIG. 1 is a schematic perspective view, partially cut away, of a housing for an electronic receiver having a receptacle for a battery pack assembly in accordance with the present invention.
Figure 2:
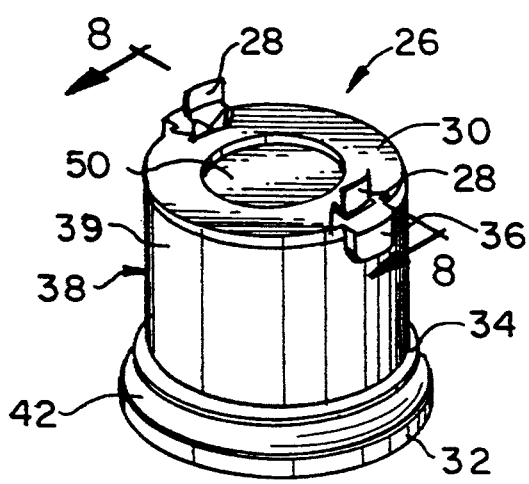
FIG. 2 is an enlarged perspective view of the battery pack which fits inside the receptacle of the receiver housing.

As illustrated in FIGS. 1 and 2, the electronic receiver carried on the collar of an animal includes a receiver housing, generally designated 10, and a battery pack, generally designated 26, which plugs into the receiver housing 10 to supply power to the circuitry of the receiver. The receiver housing 10 is formed from a housing base 14 and a mating housing cover 12 that serves to cover the housing base and enclose the interior of the housing base to house and protect the receiver electronics contained within the interior 60 of the housing base 14. The housing base 14 and the housing cover 12 are made from a non-conducting plastic material and are formed by injection molding. The housing base 14 and the housing cover 12 may be made from a polycarbonate material having a 10% glass content that exhibits ultraviolet (UV) stability.

The interior 60 of the receiver housing 10, as best shown in FIG. 4, houses and contains the receiver electronics. The receiver electronics may include, for example, a printed circuit control board, a transformer, and, optionally, an audible alarm. A number of internal posts 63 are provided within the interior of the housing base for supporting the circuit board and/or mounting the receiver electronics. Lid support members 62 are positioned along the outer periphery of the interior base 12 to provide a lid support platform for the housing cover 12.

The housing cover 12, shown in FIG. 5, is utilized to cover the electrical components located in the interior 60 of the housing base 14. Fastener pins 72 along the inner periphery of the lid 12 align with lid support members 62 for precise alignment of the housing cover 12 with the housing base 14. The housing cover 12 and housing base 14 are held together using a suitable adhesive or an ultra-sonic sealing process. As an alternative to permanent sealing, a snap fastener may be provided for removably attaching the housing cover 12 to the housing base 14 to allow easier access to the components located in the interior 60 of the housing base.

Two electrode supports 58 are formed on the outside of receiver base 14 and provide support for a pair of animal electrodes. The electrodes are mounted on the outside of the receiver housing on the electrode supports 58 in position to engage the animal to transmit an electrical shock to the animal under selected conditions to control the movement of the animal. For example, the electrodes may be screwed into the electrode supports 58 through the animal collar to hold the receiver in proper position on the animal. The electrodes are operatively connected internally of the housing base 14 with the receiver electronics to enable the desired electrical shock output to be administered to the animal.

On the bottom of the housing base, a receptacle 24 for the battery pack 26 is molded into the housing base 14 so that the receptacle 24 extends inwardly into the housing interior 60. The receptacle 24 is generally cylindrical in shape having a generally tubular sidewall 66 and a hollow interior with a closed base 25 disposed inwardly within the interior 60 of the housing base 14 and a generally circular external opening disposed at the exterior surface of the bottom of the housing base 14. As shown in FIG. 7, the tubular sidewall 66 of the receptacle 24 and the back wall 59 of receiver base 14 are molded together to form a solid support, designated 80. At the front wall 61 of the receiver base 14, the tubular sidewall 66 of the receptacle 24 is spaced away from housing base 14 by a gap 78.

As shown in FIG. 4, contact openings 68 and 70 are provided through the base 25 of the receptacle 24 to permit receptacle contacts to be mounted in the receptacle 24 to electrically connect the battery 50 of the battery pack 26 to the receiver electronics housed within the interior 60 of the housing base 14. A pair of anode contact openings 70 in the form of slotted passageways are provided through the base 25 of the receptacle and are aligned across the diameter of the base 25 along the peripheral edge of the base 25. A cathode contact opening 68 is provided as a slotted passageway through the center of the base 25. As shown in FIG. 6, anode contacts 74 in the form of rigid flat pegs are held by friction fit in anode contact openings 70 and a cathode contact 76 also in the form of a rigid flat peg is held in friction fit in the cathode contact opening 68. A central hub 65 projects from the base 25 of the receptacle 24 into the hollow interior of the receptacle to provide support for the cathode contact 76.

During assembly, the anode contacts 74 and the cathode contact 76 are inserted through the receptacle opening 16 and pressed into place respectively through anode contact openings 70 and the cathode contact opening 68. A tight press fit permits a good electrical contact between the printed circuit board and the inserted contacts, and also prevents the contacts 68 and 70 from becoming dislodged during insertion and removal of battery pack 26 relative to the receptacle 24 of the receiver housing 10. The anode contacts 74 and the cathode contact 76 may be manufactured from nickel-plated, cold-rolled spring steel.

Figure 10:
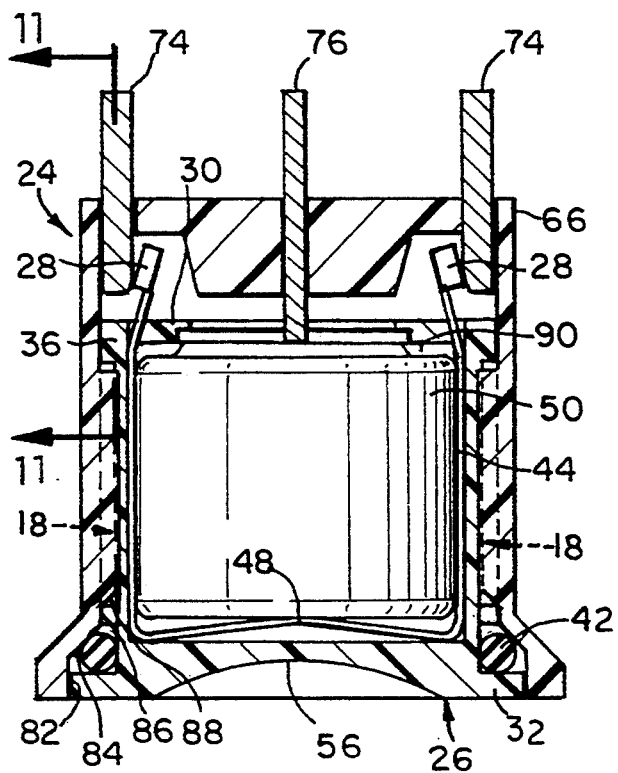
FIG. 10 is an enlarged cross-sectional, end elevational view of the receiver housing having the battery pack inserted into the receptacle of the receiver housing.
Figure 11:
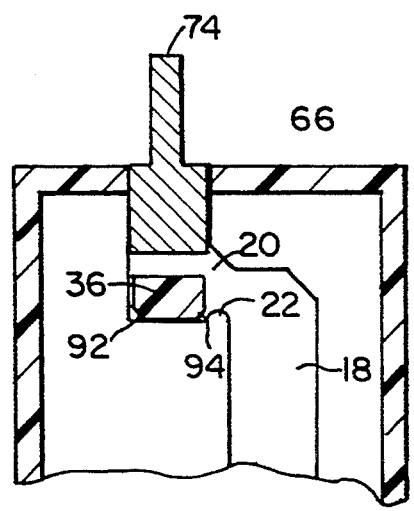
FIG. 11 is an enlarged fragmentary sectional view of the receiver housing having the battery pack inserted taken along line 11—11 of FIG. 10.

In order to guide the movement of the battery pack 26 in and out of the receptacle 24, guides in the form of guide grooves or slots 18 are provided on the interior of the sidewall 66 of the receptacle 24. As best shown in FIGS. 1, 10 and 11, a pair of conforming generally L-shaped guide grooves are positioned in a diametrically opposed orientation at least on the internal positions of the sidewall 66 of the receptacle 24. The guide grooves 18 may extend entirely through the sidewall 66 to form slots in the sidewall 66. The guide grooves are dimensioned in circumferential width and radial thickness to receive lugs 36 so that the lugs 36 freely slide within the guide grooves 18 without disengagement from the guide grooves 18.

As best shown in FIGS. 1 and 11, the guide grooves 18 include a longitudinal section 27 that originates at the open end 16 of the receptacle and extends longitudinally relative to the central axis of the receptacle toward the base 25 of the receptacle 24. The longitudinal section 27 of the guide groove functions to guide the lug 36 for longitudinal displacement of the battery pack 26 within the receptacle 24 to permit insertion and withdrawal of the battery pack relative to the receptacle. The guide grooves 18 include an adjoining transverse or circumferential section 20 to permit a lateral or circumferential displacement of the battery pack within the receptacle. The transverse section 20 of the guide groove adjoins the longitudinal section 27 at the end of the longitudinal section within the receptacle. The transverse section 20 permits the battery pack to be turned or rotated in the receptacle as circumferential movement of the lugs 36 are guided by the transverse sections of the guide grooves. Detents 22 are provided along the transverse section 20 of the guide grooves on the edge of the guide groove proximate the open end of the receptacle at the location where the longitudinal and transverse section of the guide grooves adjoin to thereby form generally J-shaped guide grooves. The detents 22 cooperate with the movement of the lugs 36 to hold the battery pack 26 in place within the receptacle 24.

Referring to FIG. 2, the assembled battery pack 26 includes a battery holder 38 for containing a battery 50 and a retaining ring 30 which functions to contain contactor 44 and the battery 50 inside the battery holder 38. The battery holder 38 and the retaining ring 30 are both injection molded from a non-conducting plastic, such as acrylonitrile butadiene styrene (ABS).

Figure 3:
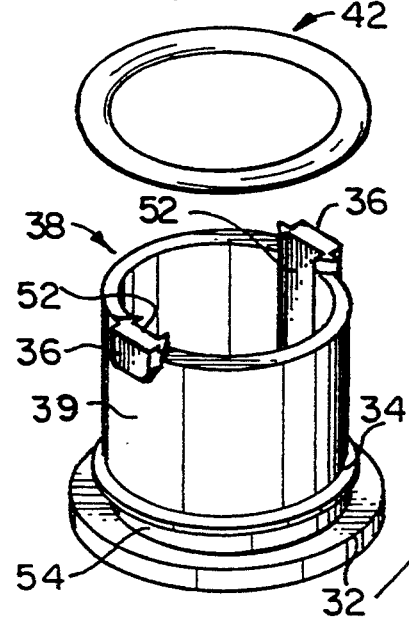
FIG. 3 is an enlarged exploded perspective view of the battery pack shown in FIG. 2.

Referring to FIG. 3, the battery holder 38 is generally cup-shaped having a generally tubular sidewall 39 and a hollow interior with an opening at one end and a closed base 32 at the other end. The battery holder 38 is generally cylindrical in outside shape to facilitate insertion and rotation within the housing receptacle 24. The base 32 has an enlarged circumference relative to the sidewall 39 so that a shoulder is formed at the junction between the sidewall and the base.

A ridge 34 is located around the circumference of battery holder 38 proximate the shoulder of the base 32 to form a groove 54 between the battery holder base 32 and the ridge 34. This groove 54 provides a location for the installation of a sealing O-ring 42. The O-ring 42 is installed by rolling it onto the battery holder 38 and precisely positioning it in groove 54. The O-ring 42 is preferably composed of a compressible, resilient rubber compound. When the battery pack 26 is fully inserted into the receptacle 24 of the receiver housing 10, a tight seal is formed between the battery pack 26 and the receiver housing 10 about the outer circumference of the receptacle 24, thereby protecting the battery 50 and the electrical components located within receiver interior 60.

The interior of battery holder 38 is generally hollow in order to accommodate the contactor 44 and the battery 50. The interior sidewall 39 of the battery holder 38 has two diametrically opposed longitudinal grooves 52 that extend from the open end of the battery holder generally to the base 32 of the battery holder for locating the contactor 44 partially within the grooves 52.

The contactor 44 is formed from an electrically-conductive material and includes two elongated contact arms 28 which are interconnected by an elongated flexion spring 48. Contactor 44 generally conforms to the inside profile of battery holder 38. A section of each contact arm 28 fits within the corresponding grooves 52 located on the inside wall 39 of the battery holder 38. The contact arms 28 are recessed within the grooves 52 to allow the inside diameter of the battery holder 38 to be reduced to provide clearance for the battery 50. In addition, positioning of the contact arms 28 within the grooves 52 serves to hold the contactor 44 in a fixed location, thereby preventing the contactor 44 from rotating inside battery holder 38 when the battery pack 26 is inserted into and removed from the receiver housing 10.

When the contactor 44 is inserted into the battery holder 38, each contact arm 28 extends generally from the base 32 of the battery holder beyond the opening of the battery holder 38. The ends of the contact arms 28 that project from the open end of the battery holder are rounded and flared to provide a desirable surface for electrical contact with anode contacts 74. In addition, the rounded and flared ends permit the contact arms 28 to easily slide over anode contacts 74 when the battery pack 26 is inserted into the receiver housing 10.

The flexion spring 48 spans between and connects with the ends of the contact arms 28 at the base of the battery holder. When the contactor 44 is fully inserted into the battery holder 38, the ends of the spring 48 butt against the battery holder base 32. The center portion of spring 48 is resiliently bowed, thus arching away from the base 32. The contactor 44 is formed out of lightweight nickel-plated, tempered stainless steel, having an approximate thickness of 0.008", so that any significant pressure exerted on the bowed portion causes spring 48 to flex or become compressed. Consequently, when the battery 50 is inserted into the battery holder 38, the battery 50 is mechanically biased by the spring toward the opening of the battery holder 38.

A cylindrical lithium battery is utilized due to its characteristically small size and extended life. The battery 50 generally conforms in shape to the interior of the battery holder. The battery 50 is oriented inside the battery holder 38 so that the anode terminal faces the battery base 32 to engage and electrically connect with the spring 48 of the contactor 44 and the cathode terminal faces the opening of the battery holder 38.

Figure 8:
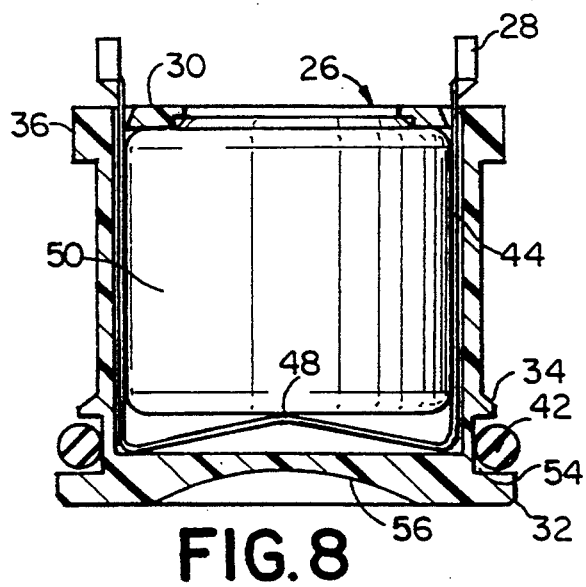
FIG. 8 is an enlarged cross-sectional view of the battery pack taken along the line 8—8 of FIG. 2.

A retaining ring 30 is attached to the battery holder 38 at the open end of the battery holder to capture and contain the contactor 44 and the battery 50 within the battery holder 38. After the contactor and the battery are properly inserted into the battery holder, the outer periphery of the retaining ring is sealed or attached to the edge of the tubular sidewall 39 of the battery holder at the open end of the battery holder. The retaining ring has a central aperture to permit the cathode terminal of the battery to be exposed on the battery pack for electrical connection to the cathode contact 76 of the receptacle 24. When assembled, the cathode of battery 50 may seat into a counter-bore in the central aperture of the retaining ring 30 as best shown in FIG. 8. Two notches 40 are provided along the outer periphery of the retaining ring 30 to provide passageways for the ends of the contact arms 28 projecting from the open end of the battery holder. The notches 40 in the retaining ring 30 are therefore positioned to align with the internal grooves 52 on the inside wall 39 of the battery holder, thereby permitting access to contact arms 28. After the retaining ring 30 is attached, battery power is available by connecting directly to the cathode of battery 50 and to the contact arms 28, which in turn are connected to the anode of battery 50 through the spring 48.

Retaining ring 30 may be securely attached to battery holder 38. Ultrasonic sealing confers the benefit of permanently sealing the battery 50 inside of the battery holder 38. Consequently, the unwary user is prevented from installing an improper battery into the battery pack 26 and damaging the receiver electronics. If desired, retaining ring 30 may be removably attached to the battery holder 38 to permit battery replacement, in which case screws, snap-mounts, or similar connectors may be utilized.

Two connector lugs 36 are provided on the outside wall 39 of the battery holder proximate the opening of the battery holder 38. The lugs 36 are generally rectangular in shape and are properly dimensioned to slide along the longitudinal guide grooves 27 and the transverse guide grooves 20 when the battery pack 26 is inserted into or removed from the receptacle 24 of the receiver housing 10. Although lugs 36 are preferably located at the opening of the battery holder 38, the lugs 36 may, alternatively, be located at another location along the outside wall 39 of the battery holder 38. Furthermore, other types of connectors or lugs, varying in shape and configuration, may be used. For example, screw-like threads, around the outer circumference of battery holder 38, may be utilized to connect battery pack 26 to the receiver housing 10.

For installing the battery pack 26 into the receptacle 24 of the receiver housing 10, the lugs 36 are initially aligned with the longitudinal grooves 27 in the receptacle 24. The battery pack 26 may then be inserted into the receptacle 24 while the lugs 36 travel along the longitudinal groove 27. As the battery pack is inserted, the cathode of battery 50 comes in contact with cathode contact 76, thereby preventing the battery 50 from traveling any further into the receptacle 24 of the receiver housing 10. The contact between the cathode of the battery and the cathode contact 76 does not, however, prevent further insertion of the battery holder 26 into receptacle 24. Instead, the contact between the cathode of the battery and the cathode contact 76 causes the spring 48 to flex or become compressed, creating a gap 90 between the retaining ring 30 and the battery 50 as shown in FIG. 10. The flexion or compression of spring 48 causes a strong electrical contact to be established between cathode contact 76 and the cathode of battery 50 and also causes the battery pack 26 to become biased toward the receptacle opening 16 and away from the receiver housing 10.

As the insertion process continues, the lugs 36 reach the ends of the longitudinal grooves 27, so that the battery pack 26 can then be rotated to lock the battery pack in position. As the battery pack 26 rotates within the receptacle 24 of the receiver housing 10, the lugs 36 travel along the transverse or circumferential grooves 20. Rotation of the battery pack 26 enables the lugs 36 to pass over the detents 22 as the spring 48 yields even further until the lugs 36 come to rest within the transverse grooves 20 beyond detents 22, as shown in FIG. 11. A ramp 92 on the lug 36 permits the lug 36 to smoothly travel past the detent 22. A second ramp 94 on the lug 36 assists in the removal of the battery pack 26 from the receptacle of the receiver housing 10 by permitting the lug to smoothly travel back over the detent 22.

After the battery pack 26 is fully inserted, the spring 48 is in a flexed or compressed state. As a result, the battery pack 26 remains biased toward the receptacle opening 16 and the lug 36 is forced against the lower edge of the transverse groove 20. The biasing effect of the spring together with the detent 22 prevent the battery pack 26 from inadvertently falling out of the receptacle of the receiver housing 10.

Referring to FIG. 10, the battery pack 26 is fully inserted into the receptacle 24 of the receiver housing 10. The spring 48 is in a compressed or flexed state, thereby creating the gap 90 between the battery 50 and the retaining ring 30. In addition, the contact arms 28 are shown in a deflected position in engagement with anode contacts 74 of the receptacle. When the battery pack 26 is initially inserted into the receptacle of the receiver housing 10, the contact arms 28 are in an undeflected state. However, when the battery pack 26 is rotated and lugs 36 travel along transverse grooves 22, the rounded portion of the contact arms 28 comes into contact with the anode contacts 74. Further rotation of the battery pack 26 then causes each contact arm 28 to deflect, permitting the rounded end portion of the contact arm to slide onto the anode contact 74 resulting in a solid electrical connection between the anode contact 74 and the contact arm 28.

As also shown in FIG. 10, the O-ring 42 causes a seal to form between the battery pack 26 and the receiver housing 10 during the insertion process. The seal is created when the O-ring 42 contacts an angled step circumferentially of the receptacle opening 16. The angled step is formed by a circular longitudinal wall 82 and an angled wall 84. The diameter of receptacle opening 16 at wall 82 is of sufficient size to allow the O-ring 42 to fit inside the receptacle 24 and come into sealing contact with the angled wall 84 which prevents any further travel of the O-ring 42. Consequently, when the battery pack 26 is fully inserted into the receiver housing 10, the O-ring 42 is compressed between the shoulder of the base 32 and the angled wall 84 so that a tight seal is formed.

As best shown in FIG. 7, a second counterbored step is disposed at the receptacle opening 16 and is formed by a circular circumferential wall 86 and an angled wall 88. This second step is provided to facilitate insertion of the battery pack 26 into the receptacle 24. Sharp corners are eliminated to allow smooth insertion of the battery pack 26.

Figure 9:
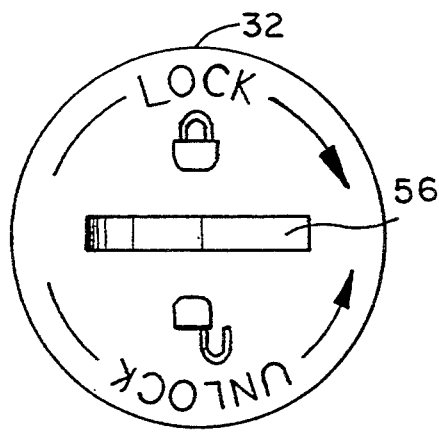
FIG. 9 is an enlarged bottom plan view of the battery pack.

An external slot 56 is provided in the base 32 of the battery holder to receive a tool to assist the user during insertion and removal of battery pack 26, as illustrated in FIGS. 9 and 10. The slot 56 is rounded allowing the use of a coin to lock or unlock the battery pack 26. After inserting a coin into the slot 56, the battery pack 26 is turned in a clockwise direction to lock battery pack 26 into the receptacle 24 of the receiver housing 10. Similarly, turning the battery pack 26 in a counter-clockwise direction unlocks the battery pack 26.

To remove the battery pack 26 from the receiver housing 10, a slight inward force is exerted on the battery pack while rotating the battery pack 26 in a counter-clockwise direction. This slight inward force allows the lug 36 to move away from the edge of the transverse groove 20 and pass over the detent 22. The lug 36 is then free to continue to slide along the longitudinal groove 27, thereby completing the removal operation.

While the electronic receiver has been developed to accept a battery pack for providing power to receiver electronics, the battery pack may provide further functionality. For example, a "smart pack" may be formed by modifying the battery pack. For example, electronic circuitry may be added to the battery pack, thereby simultaneously providing battery power and permitting communication between the battery pack and receiver electronics through the anode contacts 74 and the cathode contact 76. In such a configuration, the smart pack may be utilized to upload a new program to the receiver for execution. Alternatively, a smart pack may be used for downloading data accumulated by the receiver. After downloading is completed, the smart pack may be removed and the data may be retrieved for analysis.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A battery pack for supplying power to an electronic receiver comprising:
   (a) a battery holder shaped for receiving a battery having first and second terminals, the battery holder having an opening at one end and a generally closed base at the other end;
   (b) a contactor having a spring located inside the battery holder between the base of the battery holder and the battery for biasing the battery toward the opening of the battery holder and a contact for electrical connection with the first terminal of the battery, the contact extending outside the opening of the battery holder for electrical connection with the electronic receiver;
   (c) a retainer at the opening of the battery holder for retaining the battery within the holder against the bias of the spring with the second terminal of the battery being exposed at the opening of the battery holder for electrical connection with the electronic receiver; and
   (d) a mounting connector on the battery holder for removably mounting the battery pack onto the electronic receiver.

2. The battery pack in accordance with claim 1 wherein the retainer comprises a retaining ring at the opening of the battery holder for retaining the battery inside the battery holder against the bias of the spring, the retaining ring having a central aperture through which the second terminal of the battery is exposed for electrical connection with the electronic device.

3. The battery pack in accordance with claim 2 wherein the battery holder comprises an internal groove in which the contact is recessed within the battery holder to provide clearance for the battery inside the battery holder.

4. The battery pack in accordance with claim 3 wherein the spring is an elongated flexion spring having respective ends in contact with the base of the battery holder and a resilient center portion for electrically contacting the first terminal of the battery.

5. The battery pack in accordance with claim 1 wherein the mounting connector comprises lugs located externally of the battery holder for mounting the battery pack in position on the electronic receiver.

6. The battery pack in accordance with claim 1 wherein the base of the battery holder comprises an external slot for receiving a tool to facilitate insertion of the battery holder into the electronic receiver.

7. A battery pack for supplying power to an electronic receiver comprising:
   (a) a battery holder shaped for receiving a battery having first and second terminals, the battery holder having an opening at one end and a generally closed base at the other end and at least one internal longitudinal groove extending from the base to the opening;
   (b) a contactor having an elongated flexion spring located inside the battery holder between the base of the battery holder and the battery for biasing the battery toward the opening of the battery holder, the spring having respective ends in contact with the base of the battery holder and a resiliently bowed center portion for electrically contacting the first terminal of the battery and a contact connected with one end of the spring for electrical connection with the first terminal of the battery, the contact extending outside the opening of the battery holder for electrical connection with the electronic receiver, the contact being recessed within the longitudinal groove of the battery holder to provide clearance for the battery;

(c) at least one lug connector positioned externally on the battery holder for removably mounting the battery pack to the electronic receiver; and (d) a retaining ring mounted at the opening of the battery holder for retaining the battery inside the battery holder against the bias of the spring, the retaining ring having a central aperture through which the second terminal of the battery is exposed at the opening of the battery holder for electrical connection with the electronic receiver and at least one contact passageway at an outer periphery of the retaining ring to permit the contact to pass therethrough.

8. The battery pack in accordance with claim 7 wherein the battery holder includes a second internal longitudinal groove extending from the base of the battery holder to the opening of the battery holder, and wherein the contactor includes a second contact connected with the other end of the spring for electrical connection with the first terminal of the battery, the second contact being recessed within the second longitudinal groove to provide clearance for the battery, and wherein further the retaining ring includes a second contact passageway at the outer periphery of the retaining ring to permit the second contact to pass therethrough.

9. An electronic device comprising:
(a) a housing having a receptacle; and
(b) a battery pack removably insertable into the receptacle of the housing for supplying power to the electronic device including:
  (1) a battery holder shaped for containing a battery having first and second terminals, the battery holder having an opening at one end and a generally closed base at the other end;
  (2) a contactor having a spring located inside the battery holder between the base of the battery holder and the battery for biasing the battery toward the opening of the battery holder and at least one contact for electrical connection with the first terminal of the battery, the contact extending outside the opening of the battery holder for electrical connection within the electronic device; and
  (3) a mounting connector on the battery holder for removably mounting the battery pack within the receptacle of the housing.

10. The device in accordance with claim 9 wherein the battery pack comprises a retaining ring attached at the opening of the battery holder for retaining the battery within the battery holder against the bias of the spring, the retaining ring having a central aperture through which the second terminal of the battery is exposed at the opening of the battery holder for electrical connection within the electronic device.

11. The device in accordance with claim 9 wherein the receptacle comprises at least one internal guide groove and the mounting connector comprises at least one external lug on the battery holder of the battery pack for movement within the guide groove in the receptacle for guiding and locating the battery pack within the receptacle of the housing.

12. The device in accordance with claim 11 wherein the receptacle comprises a detent along the guide groove for cooperating with the lug of the battery pack to retain the battery pack in fixed position within the receptacle.

13. The device in accordance with claim 12 wherein the receptacle comprises a generally open end and a generally closed end and a receptacle contact positioned at the generally closed end of the receptacle for electrical connection to the second terminal of the battery, the receptacle contact engaging the second terminal of the battery thereby causing the spring of the contactor to yield so that the lug may be positioned within the guide groove to retain the battery pack in position within the receptacle.

14. The device in accordance with claim 11 wherein the guide groove is generally L-shaped having a longitudinal section to guide the lug for longitudinal movement of the battery pack within the receptacle to permit insertion of the battery pack into the receptacle and an adjoining transverse section to permit the battery pack to be moved within the receptacle to hold the battery pack in position.

15. The device in accordance with claim 14 wherein the receptacle comprises a detent positioned along the transverse section of the L-shaped guide groove for cooperating with the respective lug of the battery pack to retain the battery pack in position within the receptacle.

16. The device in accordance with claim 15 wherein the receptacle includes a generally open end and a generally closed end and a receptacle contact positioned at the generally closed end of the receptacle for electrical connection to the second terminal of the battery, the receptacle contact engaging the second terminal of the battery during insertion of the battery pack into the receptacle thereby causing the spring of the contactor to yield to permit the lug to be moved laterally within the transverse section of the guide groove past the detent so that the spring biases the battery pack into position within the receptacle with the detent in position to engage the lug and hold the battery pack within the receptacle.

17. The device in accordance with claim 13 or 16 comprising a sealing ring located around the outside of the battery holder at the closed end of the battery holder for forming a seal between the housing and the battery pack.

18. The device in accordance with claim 13 or 16 wherein the battery holder comprises at least one internal longitudinal groove extending from the base to the opening of the battery holder, the contact being recessed within the longitudinal groove of the battery holder to provide clearance for the battery inside the battery holder.

19. The device in accordance with claim 18 wherein the battery holder includes a second internal longitudinal groove extending from the base of the battery holder to the opening of the battery holder, and wherein the contactor includes a second contact for electrical connection with the first terminal of the battery, the second contact being recessed within the second longitudinal groove to provide clearance for the battery.

20. The device in accordance with claim 13 or 16 wherein the spring is an elongated flexion spring having respective ends in contact with the base of the battery holder and a resilient center portion for electrically contacting the first terminal of the battery.

21. An electronic device comprising:
(a) a battery pack including:
  (1) a battery holder shaped for receiving a battery having first and second terminals, the battery holder having an opening at one end and a generally closed base at the other end and at least one internal longitudinal groove extending from the base to the opening;

(2) a contactor having an elongated flexion spring located inside the battery holder between the base of the battery holder and the battery for biasing the battery toward the opening of the battery holder, the spring having respective ends in contact with the base of the battery holder and a resiliently bowed center portion for electrically contacting the first terminal of the battery, and a contact connected with one end of the spring for electrical connection with the first terminal of the battery, the contact extending outside the opening of the battery holder for electrical connection with the electronic device, the contact being recessed within the longitudinal groove of the battery holder to provide clearance for the battery;

(3) at least one lug connector positioned externally on the battery holder for removably mounting the battery pack to the electronic device; and (4) a retaining ring mounted at the opening of the battery holder for retaining the battery inside the battery holder against the bias of the spring, the retaining ring having a central aperture through which the second terminal of the battery is exposed at the opening of the battery holder for electrical connection with the electronic receiver, the retaining ring having at least one contact passageway at an outer periphery of the retaining ring to permit the contact to pass therethrough; and (b) a housing including a receptacle for the battery pack, the receptacle having a generally open end and a generally closed end and at least one internal groove for receiving the lug connector of the battery pack for movement within the guide groove for guiding and locating the battery pack within the receptacle of the housing, the receptacle including a detent along the guide groove for cooperating with the connector lug of the battery pack to retain the battery pack in position within the receptacle and a receptacle contact positioned at the generally closed end of the receptacle for electrical connection to the second terminal of the battery, the receptacle contact engaging the second terminal of the battery thereby causing the spring of the contactor to yield so that the lug connector may be positioned within the guide groove to retain the battery pack in position within the receptacle.

22. The device in accordance with claim 21 wherein the guide groove is generally L-shaped having a longitudinal section to guide the lug connector for longitudinal movement of the battery pack within the receptacle to permit insertion of the battery pack into the receptacle and an adjoining transverse section to permit the battery pack to be turned within the receptacle to hold the battery pack in position.

23. The device in accordance with claim 22 wherein the detent is positioned along the transverse section of the L-shaped guide groove.

24. The device in accordance with claim 23 wherein the receptacle contact engages the second terminal of the battery during insertion of the battery pack into the receptacle thereby causing the spring of the contactor to yield to permit the lug connector to be moved laterally within the transverse section of the guide groove past the detent so that the spring biases the battery pack into position within the receptacle with the detent in position to engage the lug connector to hold the battery pack within the receptacle.

25. The device in accordance with claim 22 wherein the battery pack includes a second lug connector positioned externally on the battery holder and wherein further the receptacle includes a second L-shaped guide groove for receiving the second lug connector, the second guide groove having a longitudinal section to guide the second lug connector for longitudinal movement of the battery pack within the receptacle and an adjoining transverse section to guide the second lug connector to permit the battery pack to be turned within the receptacle.

26. The device in accordance with claim 21 wherein the battery holder includes a second internal longitudinal groove extending from the base of the battery holder to the opening of the battery holder, and wherein the contactor includes a second contact connected with the other end of the spring for electrical connection with the first terminal of the battery, the second contact being recessed within the second longitudinal groove to provide clearance for the battery, and wherein further the retaining ring includes a second contact passageway at the outer periphery of the retaining ring to permit the second contact to pass therethrough.

* * * * *